US009467849B2

(12) United States Patent
Zhang

(10) Patent No.: US 9,467,849 B2
(45) Date of Patent: Oct. 11, 2016

(54) METHOD AND APPARATUS FOR SECURITY COMMUNICATION OF CARRIER AGGREGATION BETWEEN BASE STATIONS

(71) Applicant: Huawei Technologies Co., Ltd., Shenzhen, Guangdong (CN)

(72) Inventor: Hongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/314,837

(22) Filed: Jun. 25, 2014

(65) Prior Publication Data

US 2014/0308921 A1 Oct. 16, 2014

Related U.S. Application Data

(63) Continuation of application No. PCT/CN2012/087294, filed on Dec. 24, 2012.

(30) Foreign Application Priority Data

Dec. 27, 2011 (CN) .......................... 2011 1 0443754

(51) Int. Cl.
*H04M 1/66* (2006.01)
*H04W 12/04* (2009.01)
(Continued)

(52) U.S. Cl.
CPC .............. *H04W 12/04* (2013.01); *H04L 5/001* (2013.01); *H04L 5/0098* (2013.01); *H04L 2463/061* (2013.01); *H04W 76/025* (2013.01); *H04W 92/20* (2013.01)

(58) Field of Classification Search
CPC ........... H04W 12/04; H04W 36/0038; H04W 36/08; H04W 12/00; H04W 12/08; H04W 36/00; H04W 36/0083; H04W 76/025; H04W 12/06; H04W 36/24; H04W 72/042; H04L 2463/061; H04L 5/0035; H04L 5/0053
USPC ....................................................... 455/410
See application file for complete search history.

(56) References Cited

U.S. PATENT DOCUMENTS

2011/0122843 A1* 5/2011 Iwamura et al. ............. 370/331
2011/0274086 A1* 11/2011 Xu ................................ 370/331
(Continued)

FOREIGN PATENT DOCUMENTS

CN 101030849 A 9/2007
CN 102026176 A 4/2011
(Continued)

OTHER PUBLICATIONS

"Technical Specification: Digital cellular telecommunications system (Phase 2+); Universal Mobile Telecommunications System (UMTS); LTE; 3GPP System Architecture Evolution (SAE); Security architecture (3GPP TS 33.401 version 10.2.0 Release 10)," ETSI TS 133 401, V10.2.0, pp. 1-117, European Telecommunications Standards Institute, Sophia Antipolis, France (Oct. 2011).
(Continued)

*Primary Examiner* — Kwasi Karikari
(74) *Attorney, Agent, or Firm* — Leydig, Voit & Mayer, Ltd.

(57) ABSTRACT

This invention discloses a method for security communication of carrier aggregation between base stations, which method comprises receiving, by a user equipment, a first message to add a cell controlled by a secondary base station as a service cell sent by a primary base station; and creating, by the user equipment, a security key for communication with cells controlled by the secondary base station according to security context of the primary base station and the first message. This invention further discloses the corresponding user equipment and base stations. Implementation of the method and apparatus according to the present invention makes it possible to effectively protect security of data transmission of the air interface and to avoid attacks on air interface security.

16 Claims, 5 Drawing Sheets

(51) Int. Cl.
*H04W 92/20* (2009.01)
*H04W 76/02* (2009.01)
*H04L 5/00* (2006.01)

(56) References Cited

U.S. PATENT DOCUMENTS

| | | |
|---|---|---|
| 2011/0274276 A1* | 11/2011 | Xu .............................. 380/272 |
| 2011/0275374 A1 | 11/2011 | Narasimha et al. |
| 2011/0294508 A1* | 12/2011 | Min et al. ..................... 455/436 |
| 2012/0008776 A1* | 1/2012 | Ishida et al. .................. 380/247 |
| 2012/0082315 A1* | 4/2012 | Bai et al. ...................... 380/272 |
| 2012/0142361 A1 | 6/2012 | Zhao et al. |

FOREIGN PATENT DOCUMENTS

| | | |
|---|---|---|
| CN | 102026324 A | 4/2011 |
| CN | 102083153 A | 6/2011 |
| CN | 102238550 A | 11/2011 |
| JP | 2011239391 A | 11/2011 |

OTHER PUBLICATIONS

"Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.5.0 Release 10)," ETSI TS 136 300, V10.5.0, pp. 1-207, European Telecommunications Standards Institute, Sophia Antipolis, France (Nov. 2011).

"Serving Cell Handling in CA," 3GPP TSG-RAN WG2 #67bis, Miyazaki, Japan, R2-095693, $3^{rd}$ Generation Partnership Project, Valbonne, France (Oct. 12-16, 2009).

"Introduction of Carrier Aggregation," 3GPP TSG-RAN WG2 Meeting #71, Madrid, Spain, R2-104516, $3^{rd}$ Generation Partnership Project, Valbonne, France (Aug. 23-27, 2010).

"$3^{rd}$ Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331, V9.9.0, pp. 1-253, $3^{rd}$ Generation Partnership Project, Valbonne, France (Dec. 2011).

\* cited by examiner

METHOD AND APPARATUS FOR SECURITY COMMUNICATION OF CARRIER AGGREGATION BETWEEN BASE STATIONS

CROSS-REFERENCE TO RELATED APPLICATIONS

This application is a continuation of International Patent Application No. PCT/CN2012/087294, filed on Dec. 24, 2012, which claims priority to Chinese Patent Application No. 201110443754.0, filed on Dec. 27, 2011, both of which are hereby incorporated by reference in their entireties.

TECHNICAL FIELD

The present invention relates to the technical field of communications, and more particularly, to a method and an apparatus for security communication of carrier aggregation between base stations.

BACKGROUND

With the incessant development and progress of the mobile communications system, the qualities of services provided by the mobile communications system become increasingly higher. In order to maintain long-term competition advantages of 3GPP (the $3^{rd}$ Generation Partnership Project), the task of stipulating standards for LTE-A (Long Term Evolution-Advanced) is currently in progress. To further enhance spectral efficiency and user throughput of the communications system, the CA (Carrier Aggregation) technology has been introduced into LTE-A. The UE (User Equipment) in the carrier aggregation technology can make simultaneous use of multiple component carriers (CCs) (each corresponding to one cell) to perform uplink and downlink communication, whereby high-speed data transmission is supported. In these aggregated cells, one of them is a primary cell, and the remaining ones are secondary cells.

Carrier aggregation of the LTE system can be substantially divided into cell aggregation inside a base station, and cell aggregation between base stations, etc. Cell aggregation inside a base station means that service cells aggregated by the UE all belong to the same base station. In order to protect transmission security of the air interface, data and signaling should be encrypted, while security keys are not transmitted at the air interface but are derived at the UE and the base station, respectively. With respect to cell aggregation inside a base station, the same security key is used regardless at which cell the data is transmitted. The security key should be derived every time a handover occurs, and the valuation of NCC (Next Hop Chaining Counter) used for derivation of the security key is determined by MME (Mobility Management Entity), and sent to the user equipment (UE) to enable the user equipment to determine the specific mode of deriving the security key according to the valuation of NCC. With the continued development of communications technology, carrier aggregation between base stations is also a direction of future consideration, and security problem concerned therewith is also an aspect of interest to the professionals.

SUMMARY

The present invention provides a method for security communication of carrier aggregation between base stations, which method effectively protects security of data transmission of the air interface and avoids attacks on air interface security in communications employing carrier aggregation between base stations.

According to a first aspect of the present invention, there is provided a method for security communication of carrier aggregation between base stations, which method includes receiving, by a user equipment, a first message sent by a primary base station, the first message indicating that the user equipment adds at least one cell controlled by a secondary base station as a service cell; and creating, by the user equipment, a security key of the secondary base station according to security context of the primary base station and the first message, the security key of the secondary base station being used for communication between the user equipment and the secondary base station.

According to a second aspect of the present invention, there is provided a method for security communication of carrier aggregation between base stations, which method includes determining, by a primary base station, to add for a user equipment at least one cell controlled by a secondary base station as a service cell; creating, by the primary base station, at least one security key that corresponds to the service cell according to security context of the primary base station and identity information of the service cell; and transmitting, by the primary base station, the at least one security key to the secondary base station for the secondary base station to determine a security key of the secondary base station according to the at least one security key; wherein the security key of the secondary base station is used for communication between the secondary base station and the user equipment.

According to a third aspect of the present invention, there is provided a method for security communication of carrier aggregation between base stations, which method includes receiving, by a secondary base station, an indication message sent by a primary base station, wherein the indication message indicates to add at least one cell controlled by the secondary base station as a service cell of a user equipment, and the indication message has at least one security key that corresponds to the service cell; and determining, by the secondary base station, a security key of the secondary base station according to the at least one security key, the security key of the secondary base station being used for communication between the user equipment and the secondary base station.

According to a fourth aspect of the present invention, there is provided a user equipment, which includes a receiving unit, configured to receive a first message sent by a primary base station, the first message indicating that the user equipment adds as a service cell at least one cell controlled by a secondary base station; and a processing unit, configured to create a security key of the secondary base station according to security context of the primary base station and the first message, the security key of the secondary base station being used for communication between the user equipment and the secondary base station.

According to a fifth aspect of the present invention, there is provided a base station, which includes a determining unit, configured to determine to add for a user equipment at least one cell controlled by a secondary base station as a service cell; a processing unit, configured to create at least one security key that corresponds to the service cell according to security context of a primary base station and identity information of the service cell; and a transmitting unit, configured to transmit the at least one security key to the secondary base station for the secondary base station to determine a security key of the secondary base station according to the at least one security key; wherein the security key of the secondary base station is used for communication between the secondary base station and the user equipment.

According to a sixth aspect of the present invention, there is provided a base station, which includes a receiving unit, configured to receive an indication message sent by a primary base station, wherein the indication message indicates to add at least one cell controlled by a secondary base station as a service cell of a user equipment, and the indication message has at least one security key that corresponds to the service cell; and a processing unit, configured to determine a security key of the secondary base station according to the at least one security key, the security key of the secondary base station being used for communication between the user equipment and the secondary base station.

Implementation of the embodiments of the present invention achieves the advantageous effects of effectively protecting security of data transmission of the air interface and avoiding attacks on air interface security in communications employing carrier aggregation between base stations.

BRIEF DESCRIPTION OF THE DRAWINGS

In order to make clearer the explanations of the technical solutions in the embodiments of the present invention or the prior art, accompanying drawings needed in the description of the embodiments or the prior art are briefly described below. Apparently, the accompanying drawings as described below are merely directed to some embodiments of the present invention, and it would require no creative effort from persons ordinarily skilled in the art to deduce other accompanying drawings in accordance with these accompanying drawings.

DETAILED DESCRIPTION OF THE EMBODIMENTS

The technical solutions in the embodiments of the present invention will be clearly and completely described below with reference to the accompanying drawings in the embodiments of the present invention. Apparently, the embodiments as described below are merely partial, rather than the entire, embodiments of the present invention. All other embodiments obtainable by persons ordinarily skilled in the art without creative effort based on the embodiments of the present invention shall all fall within the protection scope of the present invention.

Figure 1:
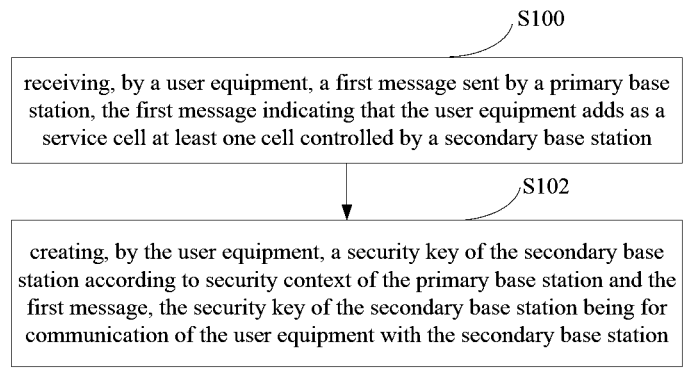
FIG. 1 is a first schematic diagram exemplarily illustrating a method for security communication of carrier aggregation between base stations according to an embodiment of the present invention.

Referring to FIG. 1, which is a first schematic diagram exemplarily illustrating a method for security communication of carrier aggregation between base stations according to an embodiment of the present invention, the method may specifically include the following steps:

S100—receiving, by a user equipment, a first message sent by a primary base station, the first message indicating that the user equipment adds as a service cell at least one cell controlled by a secondary base station;

S102—creating, by the user equipment, a security key of the secondary base station according to security context of the primary base station and the first message, the security key of the secondary base station being for communication of the user equipment with the secondary base station.

In the embodiments of the present invention, the user equipment (UE) receives a first message sent by the primary base station to add at least one cell controlled by the secondary base station as a service cell of the user equipment (UE), and the first message may be an RRC (Radio Resource Control) reconfiguration message, but may also be any other message suited to transmit the aforementioned information. As should be explained, there may be one cell controlled by the secondary base station that should be added, and there may also be multiple (more than one) cells, such as two or three cells. In the embodiments of the present invention the primary base station and the secondary base station use different security keys, i.e. the security keys are of base station level. For the same and single user equipment, data sent by service cells on different base stations may use different security keys, whereas transmission of data of service cells under the same base station (either the primary base station or the secondary base station) may use the same security key. When a secondary base station becomes a primary base station, the security key may not be derived, but remains unchanged, thus facilitating reduction of data transmission interruption, and enhancement of quality of data transmission. The secondary base station in the embodiments of the present invention may be any random base station suited to be added to the user equipment (UE).

In the embodiments of the present invention, when the at least one cell (including one or more cells) controlled by the secondary base station added in the RRC reconfiguration message as received by the user equipment (UE) is a cell controlled by the secondary base station firstly added by the UE, or in other words, when none of the service cells currently in the UE belongs to the cell controlled by the secondary base station, the user equipment (UE) creates the security key for communication of the UE with the cell controlled by the secondary base station according to security context of the current primary base station (for instance, such security related information of the primary base station as security keys and NCCs) already stored by the user equipment itself and identity information of the cell controlled by the secondary base station as added in the received RRC connection reconfiguration message. As previously mentioned, the security keys in the embodiments of the present invention are of base station level. When the cell under the secondary base station added by the UE is not the cell controlled by the secondary base station firstly added by the UE, according to the method of the embodiment of the present invention, it is not required for the UE to perform security key derivation, as it is possible to use the security key created by first adding the cell controlled by the secondary base station to perform data communication. As should be made clear, the secondary base station in the embodiments of the present invention may be any one of all secondary base stations added to the UE; when the cells controlled by the secondary base station(s) (including one or more secondary base stations) added to the UE are service cells, security key derivation is performed always based on the security context of the primary base station of the UE.

In the embodiments of the present invention, the RRC connection reconfiguration message includes PCIs (Physical Cell Identity) and EARFCNs-DL (E-UTRA Absolute Radio Frequency Channel Number-Down Link) of one or more cells controlled by the secondary base stations added to the UE. Since the RRC connection reconfiguration message includes the PCIs and the EARFCNs-DL of one or more cells controlled by the secondary base stations to be added, while for the same and single secondary base station, it suffices to perform security key derivation through the PCI and EARFCN-DL parameters of one cell controlled by the secondary base station, but PCI and EARFCN-DL parameters of the same cells must be used at the UE side and the base station side to perform security key derivation, so as to keep the security keys at the two sides consistent with each other.

One mode in the embodiments of the present invention is that the UE selects the first cell in the number of cells to be added as a security key derived cell, and the PCI and EARFCN-DL of the first cell are the corresponding security key deriving parameters. The first cell may be a service cell controlled by a secondary base station designated by the primary base station, the primary base station performs security key derivation through the identity information of the service cell (such as the PCI and EARFCN-DL information of the cell) to create at least one security key of the cell controlled by the secondary base station, and identifies the identity information of the designed cell as a security key deriving parameter in the number of cells to be added as transmitted to the secondary base station through an identity field; the secondary base station determines the security key derived cell in packing the RRC connection reconfiguration message—for instance, the secondary base station designates the identity information of the first cell in the number of cells transmitted to the UE as the security key deriving parameter. Another mode is that the primary base station does not identify any security key deriving parameter in the number of cells to be added as transmitted to the secondary base station, the secondary base station determines at its own initiative the identity information of the security key derived cell as the security key deriving parameter in packing the RRC connection reconfiguration message, and the UE can perform security key derivation according to the security key deriving parameter of the identity.

Figure 2:
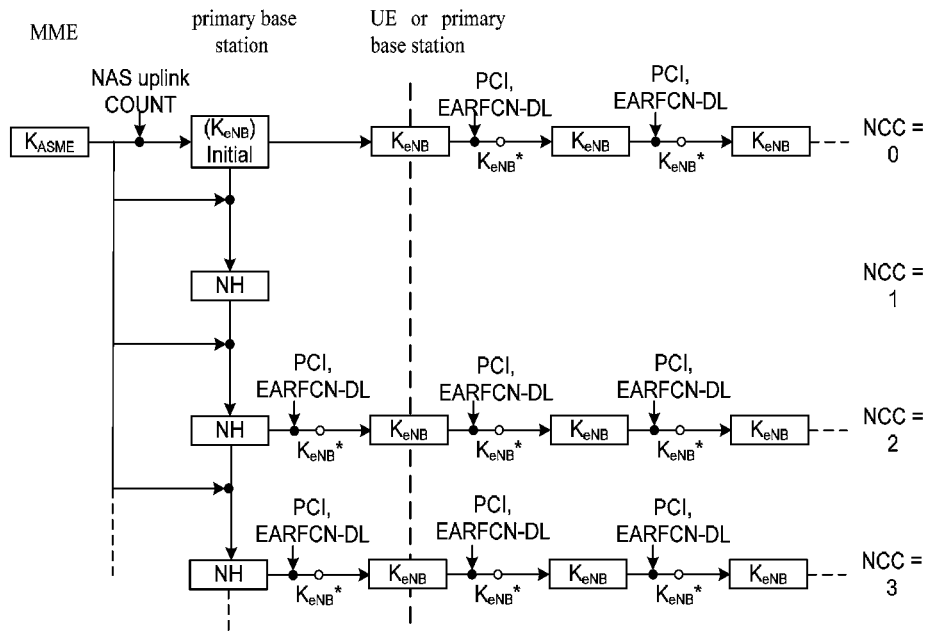
FIG. 2 is a first schematic diagram exemplarily illustrating a security key deriving algorithm according to an embodiment of the present invention.
Figure 3:
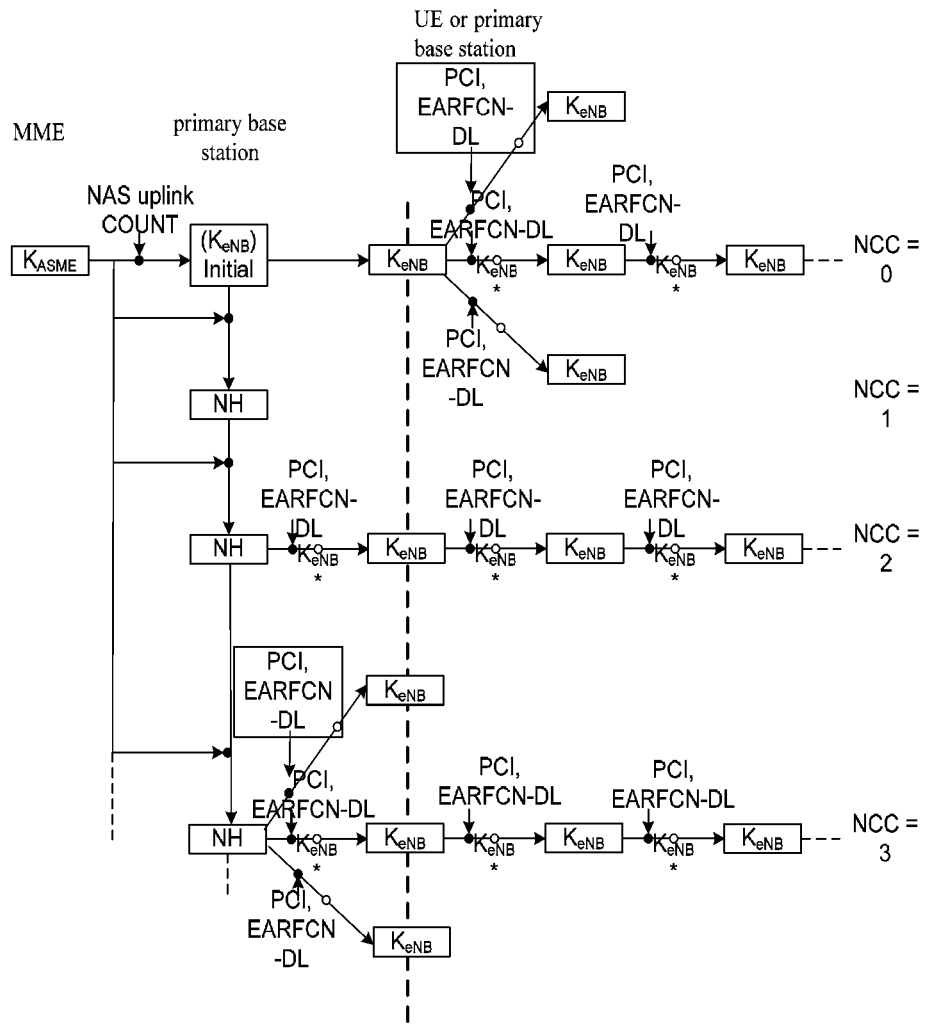
FIG. 3 is a second schematic diagram exemplarily illustrating a security key deriving algorithm according to an embodiment of the present invention.

In this embodiment, the user equipment (UE) may take the PCI and EARFCN-DL of the first cell in the number of cells as parameters according to the security key of the current primary base station stored in advance to perform horizontal security key derivation to create a security key for communication of the user equipment (UE) with the secondary base station, wherein the method for security key derivation may refer to FIG. 2, in which $K_{ASME}$ is a root security key of the UE stored by both the UE side and MME, $K_{eNB}$ is a security key of the base station, NH (Next Hop) is a security intermediate parameter directly derived time and again through the root security key $K_{ASME}$, and the value of NCC increases with each derivation—in other words, NH and NCC appear in pairs. The deriving mode always based on the previous $K_{eNB}$ is referred to as horizontal derivation, and the security key deriving mode through NH is referred to as vertical derivation. As should be explained, besides using the serial mode as shown in FIG. 2, the security key deriving mode of the UE or the secondary base station in the embodiment of the present invention may also use the parallel deriving mode shown in FIG. 3, where only two examples for parallel derivation are exemplarily shown to facilitate display, while persons skilled in the art may randomly select suitable security key deriving modes according to requirements. Although what is described in the embodiment of the present invention is a method of creating a security key for a secondary base station capable of being added to the UE, it is also possible for persons skilled in the art to make use of similar methods to perform security key derivation for a plurality of secondary base stations added to the UE. For example, in the embodiment where serial security key derivation is employed, the security key of the primary base station is $K_{eNB1}$, the security key of the first secondary base station added to the UE may be a security key $K_{eNB2}$, created by performing security key derivation on the basis of the $K_{eNB1}$, of the primary base station, while the security key of the second secondary base station added to the UE may be $K_{eNB3}$ created on the basis of the security key $K_{eNB2}$ of the first secondary base station, and then the security key of the third secondary base station added to the UE may be a security key $K_{eNB3}$ created by performing security key derivation on the basis of the security key $K_{eNB3}$ of the second secondary base station; in other words, the security keys of the first secondary base station, the second secondary base station and the third secondary base station added to the UE can be regarded to have a serial relationship. For another example, in the embodiment where parallel security key derivation is employed, the security key of the primary base station is $K_{eNB1}$, and one or more security keys of one or more (two or more than two, for instance) secondary base stations added to the UE may all be obtained by derivation on the basis of $K_{eNB1}$, —that is to say, no matter how many secondary base stations are added to the UE, the security keys of all the secondary base stations may always be derived on the basis of the security key of the primary base station; in other words, the security keys of the plurality of added secondary base stations can be regarded to have a parallel relationship with respect to the security key of the primary base station. In this embodiment, the user equipment (UE) may perform horizontal security key derivation according to the security key of the current primary base station, the PCI and EARFCN-DL identified by the secondary base station as security key deriving parameters to obtain a security key for communication of the UE with the cells controlled by the secondary base station. As should be explained, during the process of communication, when a cell for security key derivation is deleted from a secondary base station, if there are still other usable cells under this secondary base station, it is still possible to continue to use the security key derived from the deleted cell as the security key.

In the embodiments of the present invention, besides including the PCIs and EARFCNs-DL of one or more cells of the secondary base station to be added, the RRC connection reconfiguration message received by the UE may further include a next hop chaining counter (NCC), which may be a first NCC or a second NCC, of which the first NCC is an updated NCC of the primary base station, and the second NCC is an NCC that corresponds to the current security key of the primary base station. The first NCC or the second NCC is a parameter received by the secondary base station of the UE from the primary base station of the UE for creating a security key of the secondary base station. The security key deriving mode is not definite in the primary base station, as it is possible to perform horizontal derivation according to the security key of the primary base station and the identity of the service cell to be added (the NCC to which the current security key of the primary base station corresponds is the second NCC), in which case the NCC sent by the primary base station to the secondary base station for security key derivation of the secondary base station is the second NCC, and it is also possible for the primary base station to perform vertical derivation according to the updated NCC (which has not been used for security key derivation) determined by the mobility management entity (MME) stored in the primary base station and the identity of the service cell to be added (the updated NCC is the second NCC), in which case the NCC sent by the primary base station to the secondary base station for security key derivation of the secondary base station is the first NCC. In whichever cases described above, the secondary base station will send the received first NCC or second NCC again to the user equipment, so as to ensure that the security key deriving parameter in the UE be consistent with the security key of the secondary base station. If what is included in the RRC connection reconfiguration message received by the UE is the first NCC (i.e. the scenario of the updated NCC determined by the MME stored in the primary base station), the UE can perform vertical derivation according to the NH to which the first NCC in the received RRC message corresponds and the PCI and EARFCN-DL identified by the secondary base station as security key deriving parameters, so as to create a security key for communication of the UE with the cells of the secondary base station. See also FIGS. 2 and 3 for this security key deriving method. If what is included in the RRC connection reconfiguration message received by the UE is the second NCC (i.e. the scenario of the NCC to which the security key currently used by the primary base station corresponds), the UE can create a security key for communication between the user equipment and the cells of the secondary base station according to the security key of the current primary base station and the PCI and EARFCN-DL identified by the secondary base station as security key deriving parameters. See also FIGS. 2 and 3 for this security key deriving mode.

In the embodiments of the present invention, the RRC connection reconfiguration message received by the user equipment (UE) may further include a security algorithm used by the secondary base station, and the security algorithm is determined by the secondary base station according to the safety capacity of the user equipment (such as a security algorithm supportable by the user equipment) received from the primary base station. The security algorithm is any proper security algorithm that is used together with the created secrete key and that is adapted to the safety capacity of the UE. The security algorithm is used with the security key to encrypt data when the user equipment UE communicates with the secondary base station.

The method for security communication of carrier aggregation between base stations provided by the embodiment of the present invention ensures the consistency of the security keys used in the communication between the user equipment UE and the same and single secondary base station, and ensures that different secondary base stations use different security keys to ensure security of data transmission of the air interface and to avoid attacks on air interface security.

Figure 4:
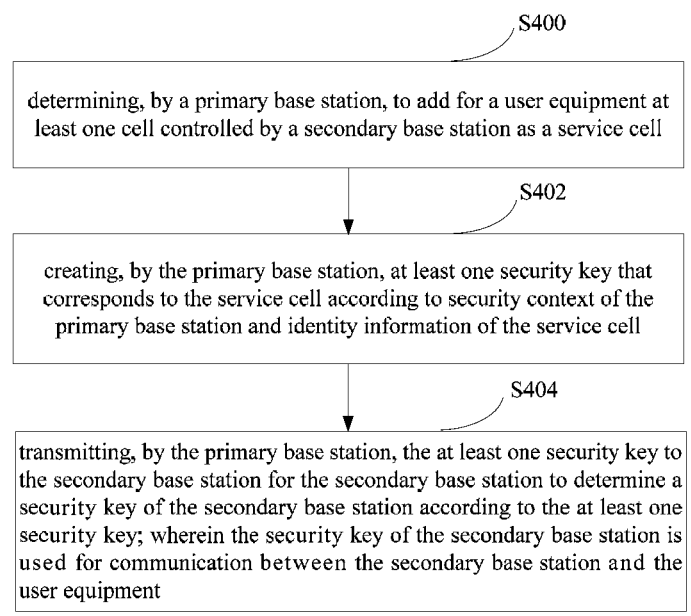
FIG. 4 is a second schematic diagram exemplarily illustrating a method for security communication of carrier aggregation between base stations according to an embodiment of the present invention.

Referring to FIG. 4, which is a second schematic diagram exemplarily illustrating a method for security communication of carrier aggregation between base stations according to an embodiment of the present invention, the method may include the following steps;

S400—determining, by a primary base station, to add for a user equipment at least one cell controlled by a secondary base station as a service cell;

S402—creating, by the primary base station, at least one security key that corresponds to the service cell according to security context of the primary base station and identity information of the service cell;

S404—transmitting, by the primary base station, the at least one security key to the secondary base station for the secondary base station to determine a security key of the secondary base station according to the at least one security key; wherein the security key of the secondary base station is used for communication between the secondary base station and the user equipment.

In the embodiments of the present invention, the primary base station determines to add for the user equipment (UE) a cell controlled by the secondary base station as a service cell, and the primary base station of the user equipment can either add for the UE one cell controlled by the secondary base station as a service cell or add for the UE plural (more than one) cells controlled by the secondary base station as service cells. After it is determined to add the cell controlled by the secondary base station for the UE, candidate cells to be added are determined according to cell information (such as PCIs and EARFCNs-DL of the cells) measured in advance, and security key derivation is performed to create the security keys of the cells according to the current security context (including such security related information as security keys and next hop chaining counters (NCCs)) and identity information (such information as the PCIs and EARFCNs-DL of the cells) of the cells controlled by the secondary base station to be added. Since the security keys in the embodiments of the present invention are of base station level, it suffices for the same and single secondary base station to create the security key through the identity information of the next cell of the secondary base station. The primary base station may designate a cell as a security key deriving cell, and the identity information of the designated service cell (such as the PCI and EARFCN-DL information of the cell) is performed with security key derivation to create a shared security key of the cells controlled by the secondary base station; the designated service cell is identified by an identity field in the number of cells to be added as transmitted to the secondary base station, to instruct the secondary base station to take the designated service cell as the first cell in the number of cells while packaging the number of service cells to be added. The primary base station may perform horizontal security key derivation to create a security key that corresponds to the designated service cell (see also FIGS. 2 and 3 for the security key deriving mode), according to the current security key, and the PCI and EARFCN-DL of the designated service cell, as the security key of the secondary base station to which the designated service cell belongs, namely as a shared security key for communication of the UE with the secondary base station based on all service cells. The NCC to which the current security key of the primary base station corresponds is the second NCC. The primary base station may also perform vertical security key derivation to create the security key that corresponds to the service cell, according to the updated NCC (the first NCC) determined by the MME and the PCI and EARFCN-DL of the designated service cell, as a shared security key for communication of the UE with all service cells of the secondary base station.

In other embodiments of the present invention, the primary base station may also not designate any security key deriving cell, in which case the primary base station may perform horizontal security key derivation (see also FIGS. 2 and 3 for the security key deriving method) with the PCIs and EARFCNs-DL of plural cells to be added as parameters according to the current security key to create a plurality of different security keys, and the each different security keys corresponds to the plural service cells—that is to say, one security key is created corresponding to the PCI and EARFCN-DL of each cell. The primary base station may also perform vertical security key derivation according to an updated NCC (the second NCC) determined by the MME and the PCIs and EARFCNs-DL of plural cells to be added to create a plurality of different security keys, and the each different security keys corresponds to the plural service cells.

In the embodiments of the present invention, the primary base station of the user equipment transmits the created one or more security keys to the secondary base station via a cell addition request message, or an initial context establishment request message, or an establishment request message of the secondary base station. Besides transmitting the one or more security keys to the secondary base station, the primary base station further transmits the first NCC or the second NCC for the security key of the secondary base station to the secondary base station. In addition, the primary base station of the user equipment may further transmit the safety capability of the user equipment to the secondary base station, and the safety capability includes such information as the security algorithm supportable by the user equipment. The NCC and the safety capability of the user equipment can be transmitted together with the one or more security keys to the secondary base station via the cell addition request message, or the initial context establishment request message, or the establishment request message of the secondary base station. In some embodiments, the aforementioned message transmitted to the secondary base station may further include measurement report information of the service cell to be added (such as the PCI and EARFCN-DL information of the cell), and the measurement report information may be used to help the secondary base station of the user equipment finally determine which one or ones controlled by the secondary base station added to the UE is/are the service cell(s).

While ensuring that the security keys used in the communication of the user equipment with the same and single secondary base station be consistent, the method for security communication provided by the embodiment of the present invention effectively protects security of data transmission of the air interface and avoids attacks on air interface security.

Figure 5:
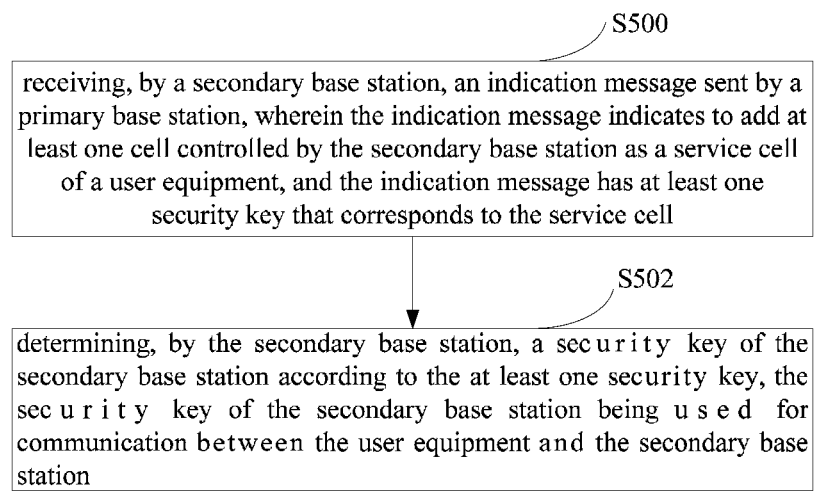
FIG. 5 is a third schematic diagram exemplarily illustrating a method for security communication of carrier aggregation between base stations according to an embodiment of the present invention.

Referring to FIG. 5, which is a third schematic diagram exemplarily illustrating a method for secure preprocessing of carrier aggregation between base stations according to an embodiment of the present invention, the method may specifically include the following steps:

S500—receiving, by a secondary base station, an indication message sent by a primary base station, wherein the indication message indicates to add at least one cell controlled by the secondary base station as a service cell of a user equipment, and the indication message has at least one security key that corresponds to the service cell;

S502—determining, by the secondary base station, a security key of the secondary base station according to the at least one security key, the security key of the secondary base station being for communication of the user equipment with the secondary base station.

In the embodiments of the present invention, the secondary base station of the user equipment receives an indication message sent by the primary base station of the user equipment, the indication message indicates to add at least one cell controlled by the secondary base station as a service cell, the indication message includes at least one security key that corresponds to the service cell, the security key may either be a security key designed by the primary base station for communication of the UE with the cells of the secondary base station, or a plurality of security keys, and the each different security keys corresponds to the plural service cells, and the secondary base station may determine one security key from the plurality of security keys as the security key for communication of the UE with the cells of the secondary base station. The secondary base station of the user equipment further receives a first NCC or a second NCC from the primary base station of the user equipment for creating the security key of the secondary base station, of which the first NCC is an updated NCC of the primary base station, and the second NCC is an NCC that corresponds to the current security key of the primary base station. In addition, the secondary base station of the user equipment further receives the safety capability of the user equipment transmitted from the primary base station of the user equipment, and the measurement report information of the service cells to be added. The secondary base station of the user equipment may finally determine which cell or cells controlled by the secondary base station should be added to the UE according to the information of the added cell(s) (such as the load of the cell(s) and the measurement report information of the cell(s)) and the own policy of the secondary base station, and choose a security algorithm used in communication with the UE according to the safety capability of the UE. The secondary base station may determine one security key from the plurality of received security keys, and identify the identity information of the cell corresponding to the security key (such as the PCI and EARFCN-DL information of the cell) as a security key deriving parameter, so as to package a first message for transmission to the UE, to instruct the UE to use the identified security key deriving parameter to perform security key derivation, so as to ensure that the security keys of the UE and the base station be consistent. The secondary base station may further take the cell corresponding to a security key sent by the primary base station as the first cell in the number of cells to be added, and identify the identity information of the first cell as a security key deriving parameter to instruct the UE to use the security key deriving parameter to perform security key derivation.

In the embodiments of the present invention, the secondary base station of the user equipment may transmit the determined security key of the secondary base station, such as a designated security key sent by the primary base station or a security key determined by the secondary base station from a plurality of security keys, to the primary base station via the first message, and the security key is forwarded by the primary base station to the user equipment. The first message may be an RRC connection reconfiguration message, which may be placed in a cell addition corresponding message between base stations and transmitted to the primary base station, and the primary base station first extracts the RRC connection message and then transmits it to the user equipment. The RRC message may further be used to instruct the user equipment to add at least one cell controlled by the secondary base station as a service cell.

In the embodiments of the present invention, the secondary base station of the user equipment may further transmit a first NCC or a second NCC received from the primary base station to the user equipment via the primary base station. In addition, the security algorithm determined according to the safety capability of the user equipment may be further transmitted to the user equipment via the primary base station. Persons skilled in the art may choose any suitable message adapted for transmitting the NCC and the security algorithm for transmission according to the equipments of application.

While ensuring consistency of the security keys used in the communication of the user equipment (UE) with the same and single secondary base station, the method for security communication provided by the embodiment of the present invention effectively protects security of data transmission of the air interface and avoids attacks on air interface security.

Methods for security communication of carrier aggregation between base stations according to the present invention have been enunciated above with reference to the accompanying drawing and the embodiments, while apparatuses of carrier aggregation between base stations according to the present invention will be explained in detail below with reference to the accompanying drawing and the embodiments.

Figure 6:
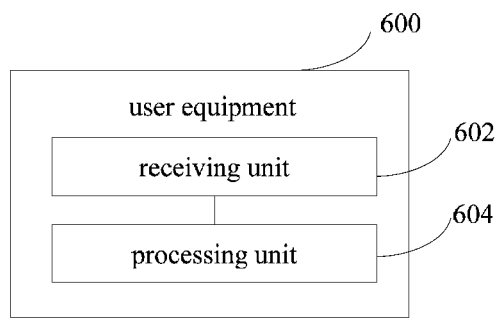
FIG. 6 is a schematic diagram exemplarily illustrating the structure of a user equipment according to an embodiment of the present invention.

Referring to FIG. 6, which is a schematic diagram exemplarily illustrating the structure of a user equipment according to an embodiment of the present invention, the user equipment 600 may specifically include the following units.

A receiving unit 602 is configured for receiving a first message sent by a primary base station, the first message indicating that the user equipment adds as a service cell at least one cell controlled by a secondary base station.

A processing unit 604 is configured for creating a security key of the secondary base station according to security context of the primary base station and the first message, the security key of the secondary base station being for communication of the user equipment with the secondary base station.

In the embodiments of the present invention, the receiving unit receives a first message sent by the primary base station of the user equipment, and the first message may be an RRC connection reconfiguration message, and may be used for the user equipment to add at least one cell controlled by the secondary base station as a service cell. The first message further includes a physical cell identity (PCI) and a downlink absolute radio frequency channel number (EARFCN-DL) of the service cell. The processing unit may take the PCI and EARFCN-DL identified by the secondary base station as security key deriving parameters as received by the receiving unit as parameters to perform horizontal security key derivation to obtain a security key for communication of the UE with the cells under the secondary base station (see also FIGS. 2 and 3 for the security key deriving method) according to the security key of the current primary base station, and the PCI and EARFCN-DL identified as security key deriving parameters may either be the PCI and EARFCN-DL of the first cell in the number of cells to be added, or the PCI and EARFCN-DL determined by the secondary base station from PCIs and EARFCNs-DL of a plurality of cells. The receiving unit in the embodiment of the present invention may be realized by such a receiving device as a receiver, and the processing unit may be realized by a data processing device or a processor.

In some other embodiments of the present invention, the RRC received by the receiving unit may further include a first next hop chaining counter (NCC) and a second NCC for creating a security key of the secondary base station, of which the first NCC is an updated NCC of the primary base station, and the second NCC is an NCC that corresponds to the current security key of the primary base station. If what the UE receives is the first NCC (i.e. the scenario of the latest NCC determined by the MME stored in the primary base station), the processing unit can perform security key derivation according to the NH to which the first NCC corresponds and the PCI and EARFCN-DL identified by the secondary base station as security key deriving parameters to create the security key of the secondary base station (see also FIGS. 2 and 3 for the security key deriving mode). If what the UE receives is the second NCC, the processing unit can perform security key derivation according to the security key of the current primary base station and the PCI and EARFCN-DL identified by the secondary base station as security key deriving parameters to create the security key of the secondary base station (see also FIGS. 2 and 3 for the security key deriving mode).

In the embodiments of the present invention, the receiving unit may further receive a security algorithm used by the secondary base station, and the security algorithm is determined by the secondary base station according to the safety capacity of the user equipment (such as a security algorithm supportable by the user equipment) received from the primary base station. The secondary base station transmits the security algorithm to the user equipment via the primary base station. The security algorithm is any proper security algorithm that is used together with the created secrete key and that is adapted to the safety capacity of the UE. The security algorithm is used with the security key to encrypt data when the user equipment (UE) communicates with the secondary base station.

The user equipment (UE) provided by the embodiments of the present invention can execute the actions of the UE in the foregoing method embodiments. The UE obtains service cells required to be added, ensures the consistency of the security keys used in the communication with the secondary base station to be added, and effectively ensures security of data transmission of the air interface and avoids attacks on air interface security in the communication of carrier aggregation.

Figure 7:
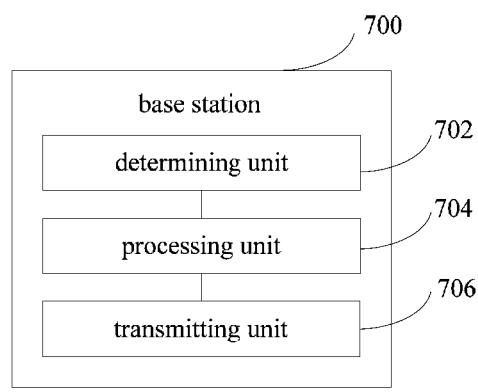
FIG. 7 is a first schematic diagram exemplarily illustrating the structure of a base station according to an embodiment of the present invention.

Referring to FIG. 7, which is a first schematic diagram exemplarily illustrating the structure of a base station according to an embodiment of the present invention, the base station 700 may specifically include the following units.

A determining unit 700 is configured for determining to add for a user equipment at least one cell controlled by a secondary base station as a service cell.

A processing unit 702 is configured for creating at least one security key that corresponds to the service cell according to security context of a primary base station and identity information of the service cell.

A transmitting unit 704 is configured for transmitting the at least one security key to the secondary base station for the secondary base station to determine a security key of the secondary base station according to the at least one security key; wherein the security key of the secondary base station is used for communication between the secondary base station and the user equipment.

The base station in the embodiments of the present invention may serve as the primary base station in the security communication of carrier aggregation between base stations. The determining unit determines to add for the UE a cell controlled by the secondary base station as a service cell, and the determining unit can either add for the UE one cell controlled by the secondary base station as a service cell or add for the UE plural (more than one) cells controlled by the secondary base station as service cells. After it is determined to add the cell controlled by the secondary base station for the UE, the processing unit determines candidate cells to be added according to cell information (such as PCIs and EARFCNs-DL of the cells) measured in advance, and performs security key derivation to create the security keys of the secondary base station according to the current security context (including such security related information as security keys and next hop chaining counters (NCCs)) and identity information of the service cells to be added. Specifically, the processing unit creates at least one security key that corresponds to the service cell according to the current security key, the PCI and the EARFCN-DL of the service cell (see also FIGS. 2 and 3 for the security key deriving method). The at least one security key may either be a designated security key of a service cell or a plurality of different security keys that correspond to a plurality of service cells. The determining unit and the processing unit according to the embodiment of the present invention can be realized by such data processing devices as processors.

In the embodiments of the present invention, when there are plural service cells to be added, the processing unit creates a shared security key that corresponds to the service cells according to the security context of the primary base station and the PCI and EARFCN-DL identified by the primary base station as security key deriving parameters, or creates different security keys according to the security context of the primary base station and the PCIs and EARFCNs-DL of the plurality of service cells, and the each different security keys corresponds to the plural service cells.

In some other embodiments of the present invention, the processing unit may create at least one security key that corresponds to the service cell according to the next hop (NH) that corresponds to the first NCC and the PCI and EARFCN-DL of the service cell, or create at least one security key that corresponds to the service cell according to the current security key of the primary base station, and the PCI and EARFCN-DL of the service cell. The first NCC is an updated NCC of the primary base station, and the second NCC is an NCC that corresponds to the current security key of the primary base station. In the embodiments of the present invention, the transmitting unit transmits one or more security keys created by the processing unit to the corresponding secondary base station via a cell addition request message, or an initial context establishment request message, or an establishment request message of the secondary base station, for instance. Besides transmitting the one or more security keys to the secondary base station, the transmitting unit further transmits the first NCC or the second NCC for creating the security key of the secondary base station to the secondary base station. In addition, the transmitting unit may further transmit the safety capability of the user equipment to the secondary base station, and the safety capability includes such information as the security algorithm supportable by the user equipment. The NCC and the safety capability of the user equipment can be transmitted together with the one or more security keys to the secondary base station via the cell addition request message, or the initial context establishment request message, or establishment request message of the secondary base station. In some embodiments, the aforementioned message transmitted to the secondary base station may further include measurement report information of the cell (such as the PCI and EARFCN-DL information of the cell), and the measurement report information may be used to help the secondary base station finally determine which one or ones controlled by the secondary base station added to the UE is/are the service cell(s). The transmitting unit in the embodiment of the present invention may be realized by such transmitting devices as a transmitter.

The base station provided by the present invention can execute the actions of the primary base station in the foregoing method embodiments. The base station determines service cells to be added to the UE, ensures the consistency of the security keys used in the communication between the user equipment (UE) served by the base station and the secondary base stations to be added to the user equipment (UE), and ensures security of data transmission of the air interface and avoids attacks on air interface security in the security communication of carrier aggregation.

Figure 8:
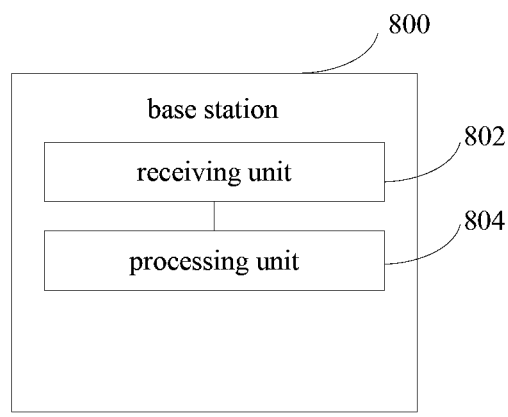
FIG. 8 is a second schematic diagram exemplarily illustrating the structure of a base station according to an embodiment of the present invention.

Referring to FIG. 8, which is a second schematic diagram exemplarily illustrating the structure of a base station according to an embodiment of the present invention, the base station 800 may specifically include the following units.

A receiving unit 800 is configured for receiving an indication message sent by a primary base station, wherein the indication message indicates to add at least one cell controlled by a secondary base station as a service cell of a user equipment, and the indication message has at least one security key that corresponds to the service cell.

A processing unit 802 is configured for determining a security key of the secondary base station according to the at least one security key, the security key of the secondary base station being for communication of the user equipment with the secondary base station.

The base station in the embodiments of the present invention may serve as the secondary base station in the security communication of carrier aggregation between base stations. The receiving unit receives an indication message sent by a primary base station, the indication message indicates to add at least one cell controlled by the secondary base station as a service cell of the user equipment, and the indication message has at least one security key that corresponds to the service cell. The receiving unit further receives a first NCC or a second NCC for creating a security key of the secondary base station from the primary base station of the user equipment. In addition, the receiving unit further receives the safety capability of the user equipment transmitted from the primary base station of the user equipment, and the measurement report information of the cell. The processing unit may finally determine which cell or cells controlled by the secondary base station should be added to the UE according to the information of the added cell(s) (such as the load of the cell(s) and the measurement report information of the cell(s)) and the own policy of the secondary base station, and choose a security algorithm used in communication with the UE according to the safety capability of the UE. Since it suffices to select the security key that corresponds to the next cell of the secondary base station to communicate with the user equipment, the secondary base station will determine the security key from the at least one security key as received for communication of the UE with the secondary base station. If what the secondary base station receives is only a security key designated by the primary base station, the processing unit may take the cell to which the designated security key corresponds as the first cell in the number of cells to be added; if what the secondary base station receives are a plurality of security keys transmitted by the primary base station and corresponding to a plurality of service cells, the processing unit may determine one security key from the plurality of security keys as the security key for communication of the UE with the cells of the secondary base station, and identify the identity information (such as the PCI and EARFCN-DL of the cell) of the cell to which the determined security key corresponds as security key deriving parameters to instruct the UE to create the security key via the identified security key deriving parameters, so as to ensure consistency of the security keys of the UE and the base station.

In the embodiments of the present invention, the transmitting unit transmits the information of the cell(s) (including one or more cells) determined to be added and the determined security key to the user equipment via the primary base station through a first message. The first message may be an RRC connection reconfiguration message, which may be placed in a cell addition corresponding message between base stations and transmitted to the primary base station, and the primary base station first extracts the RRC connection message and then transmits it to the user equipment.

In the embodiments of the present invention, the transmitting unit may further transmit a first NCC or a second NCC received by the secondary base station from the primary base station to the user equipment via the primary base station. In addition, the transmitting unit may further transmit the security algorithm determined according to the safety capability of the user equipment as received from the primary base station to the user equipment via the primary base station. Persons skilled in the art may choose any suitable message adapted for transmitting the NCC and the security algorithm for transmission according to the equipments of application.

The base station provided in the embodiments of the present invention can execute the actions executed by the secondary base station in the foregoing method embodiments. The base station obtains service cells to be added to the user equipment (UE), ensures the consistency of the security keys used in the communication with the user equipment (UE), and ensures security of data transmission of the air interface in the communication of carrier aggregation.

An embodiment of the present invention provides a communication system that includes the base stations according to the various embodiments as shown in FIG. 7 and FIG. 8, of which the base station according to the embodiment as shown in FIG. 7 may serve as the primary base station of the user equipment (UE) in the communication of carrier aggregation, while the base station according to the embodiment as shown in FIG. 8 may serve as the secondary base station of the user equipment (UE) in the communication of carrier aggregation. As should be understood, one or more secondary base stations may be added to the UE, and the security keys of the one or more secondary base stations may always be derived on the basis of the security key of the primary base station (namely the scenario of parallel deriving mode), and may also be derived by the aforementioned serial deriving mode.

The communication system provided by the embodiments of the present invention ensures security of data transmission of the air interface and avoids attacks on air interface security in the communication of carrier aggregation.

As comprehensible to persons ordinarily skilled in the art, the entire or partial flows in the aforementioned method embodiments can be realized by a computer program that instructs corresponding hardware, and the program can be stored in a computer-readable storage medium, and, when executed, may include the flows of the aforementioned various method embodiments. The storage medium may be a magnetic disk, an optical disk, a read-only memory (ROM), or a random access memory (RAM), and so on.

The disclosure above is merely directed to preferred embodiments of the present invention, and of course shall not be construed as restricting the scope of the present invention, so any equivalent variation made in the claims of the present invention shall still be covered within the protection scope of the present invention.

What is claimed is:

1. A method for security communication of carrier aggregation between base stations, comprising:
   receiving, by a user equipment, a first message sent by a primary base station, the first message indicating to add at least one cell controlled by a secondary base station as a service cell of the user equipment; and
   creating, by the user equipment, a second security key of the secondary base station according to security context of the primary base station and the first message, when no cell currently serving for the user equipment is controlled by the secondary base station;
   communicating according to the second security key of the secondary base station, by the user equipment, with the secondary base station while keeping in touch with the primary base station.

2. The method according to claim 1, wherein a first security key of the primary base station according to which the user equipment keeps in touch with the primary base station is different from the second security key of the secondary base station.

3. The method according to claim 1, wherein the first message is Radio Resource Control connection reconfiguration message comprising a security algorithm determined by the secondary base station according to safety capacity of the user equipment.

4. A method for security communication of carrier aggregation between base stations, comprising:
   receiving, by a secondary base station, an indication message sent by a primary base station when no cell controlled by the secondary base station is a service cell currently serving for a user equipment wherein the indication message indicates to add at least one cell controlled by the secondary base station as the service cell of the user equipment, and the indication message comprises a second security key that corresponds to the secondary base station to which the service cell is subordinated; and
   communicating, according to the second security key of the secondary base station, by the secondary base station, with the user equipment which synchronously keeps in touch with the primary base station.

5. The method according to claim 4, further comprising:
   forwarding, by the secondary base station, a first message via the primary base station to the user equipment, the first message indicating that the user equipment adds at least one cell controlled by the secondary base station as the service cell.

6. The method according to claim 5, wherein
   the first message comprises a first next hop chaining counter (NCC) and a second NCC from the primary base station, wherein the first NCC or the second NCC is used for creating the security key of the secondary base station, the first NCC is an updated NCC of the primary base station, and the second NCC is an NCC that corresponds to the current security key of the primary base station.

7. The method according to claim 4, wherein the second security key of the secondary base station is different from a first security key of the primary base station according to which the user equipment synchronously keeps in touch with the primary base station.

8. The method according to claim 4, further comprising:
transmitting to the user equipment via the primary base station, by the secondary base station, a security algorithm determined according to safety capacity of the user equipment, wherein the safety capacity of the user equipment is received from the primary base station.

9. A user equipment, comprising a processor and a non-transitory processor-readable medium having processor-executable instructions stored thereon, the processor-executable instructions are executed by the processor to perform:
receiving a first message sent by a primary base station, the first message indicating to add at least one cell controlled by a secondary base station as a service cell of the user equipment; and
creating a second security key of the secondary base station according to security context of the primary base station and the first message, when no cell currently serving for the user equipment is controlled by the secondary base station;
communicating according to the second security key of the secondary base station, by the user equipment, with the secondary base station while keeping in touch with the primary base station.

10. The user equipment according to claim 9, wherein a first security key of the primary base station according to which the user equipment keeps in touch with the primary base station is different from the second security key of the secondary base station.

11. The user equipment according to claim 9, wherein the first message is Radio Resource Control connection reconfiguration message comprising a security algorithm determined by the secondary base station according to safety capacity of the user equipment.

12. A base station, comprising a processor and a non-transitory processor-readable medium having processor-executable instructions stored thereon, the processor-executable instructions are executed by the processor to perform:
receiving an indication message sent by a primary base station when no cell controlled by the base station is a service cell of a user equipment, wherein the indication message indicates to add at least one cell controlled by the base station as the service cell of the user equipment, and the indication message comprises a second security key that corresponds to the base station to which the service cell is subordinated; and
communicating, according to the second security key of the secondary base station, with the user equipment which synchronously keeps in touch with the primary base station.

13. The base station according to claim 12, the processor-executable instructions are further executed by the processor to perform:
transmitting a first message to the primary base station to be forwarded via the primary base station to the user equipment, wherein the first message indicates to add the at least one cell controlled by the base station as the service cell.

14. The base station according to claim 13, wherein the first message comprises a first next hop chaining counter (NCC) and a second NCC from the primary base station, wherein the first NCC or the second NCC is configured to create the security key of the base station, the first NCC is an updated NCC of the primary base station, and the second NCC is an NCC that corresponds to the current security key of the primary base station.

15. The base station according to claim 12, wherein the second security key of the base station is different from a first security key of the primary base station according to which the user equipment synchronously keeps in touch with the primary base station.

16. The base station according to claim 12, wherein the processor-executable instructions are further executed by the processor to perform:
transmitting a security algorithm determined according to safety capacity of the user equipment to the user equipment via the primary base station, wherein the safety capacity of the user equipment is received from the primary base station.

* * * * *